US012598360B2

(12) United States Patent
Yang et al.

(10) Patent No.: US 12,598,360 B2
(45) Date of Patent: Apr. 7, 2026

(54) VIDEO CAPTIONING GENERATION SYSTEM AND METHOD

(71) Applicant: Lemon Inc., Grand Cayman (KY)

(72) Inventors: Linjie Yang, Los Angeles, CA (US);
Heng Wang, Los Angeles, CA (US);
Yuhan Shen, Los Angeles, CA (US);
Longyin Wen, Los Angeles, CA (US);
Haichao Yu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 137 days.

(21) Appl. No.: 18/314,019

(22) Filed: May 8, 2023

(65) Prior Publication Data

US 2024/0380949 A1 Nov. 14, 2024

(51) Int. Cl.
*H04N 21/488* (2011.01)
*H04N 21/2389* (2011.01)
*H04N 21/84* (2011.01)

(52) U.S. Cl.
CPC ... *H04N 21/4884* (2013.01); *H04N 21/23892* (2013.01); *H04N 21/84* (2013.01)

(58) Field of Classification Search
CPC .... H04N 5/93; H04N 5/9305; H04N 21/4355; H04N 21/2343; H04N 21/23614; H04N 21/236; H04N 21/23602; H04N 21/23605; H04N 21/23608; H04N 21/23611; H04N 21/23617; H04N 5/262; H04N 5/265; H04N 5/278; H04N 21/80; H04N 21/81; H04N 21/8126; H04N 21/4884; H04N 21/23892; H04N 21/84; H04N 21/85; H04N 21/233; H04N 21/23418; H04N 21/4394; H04N 21/44008; G06V 20/47
See application file for complete search history.

(56) References Cited

U.S. PATENT DOCUMENTS

2018/0189572 A1* 7/2018 Hori ........................ G06N 3/044
2022/0044022 A1* 2/2022 Gan ........................ G06V 20/46
2024/0169711 A1* 5/2024 Choudhary ........... G06F 18/253
2024/0233385 A1* 7/2024 Kim ........................ G06V 40/20
2024/0288870 A1* 8/2024 Hori ........................ G06V 40/20

OTHER PUBLICATIONS

Gong, Y. et al., "AST: Audio Spectrogram Transformer," Proceedings of InterSpeech 2021, Aug. 30, 2021, Brno, Czech Republic, 5 pages.

(Continued)

*Primary Examiner* — John W Miller
*Assistant Examiner* — Humam M Satti
(74) *Attorney, Agent, or Firm* — Alleman Hall LLP

(57) ABSTRACT

A system and a method are provided that include a processor executing a caption generation program to receive an input video, sample video frames from the input video, extract video frames from the input video, extract video embeddings and audio embeddings from the video frames, including local video tokens and local audio tokens, respectively, input the local video tokens and the local audio tokens into at least a transformer layer of a cross-modal encoder to generate multi-modal embeddings, and generate video captions based on the multi-modal embeddings using a caption decoder.

18 Claims, 10 Drawing Sheets

(56)     References Cited

OTHER PUBLICATIONS

Huang, G. et al., "Multimodal Pretraining for Dense Video Captioning," Proceedings of the 1st Conference of the Asia-Pacific Chapter of the Association for Computational Linguistics and the 10th International Joint Conference on Natural Language Processing, Dec. 4, 2020, Suzhou, China, 21 pages.

Lavie, A. et al., "METEOR: An Automatic Metric for MT Evaluation with High Levels of Correlation with Human Judgments," Proceedings of the Second Workshop on Statistical Machine Translation, Jun. 2007, Prague, Czech Republic, 4 pages.

Li, L. et al., "VALUE: A Multi-Task Benchmark for Video-and-Language Understanding Evaluation," Proceedings of the 35th Conference on Neural Information Processing Systems, Dec. 6, 2021, Virtual, 21 pages.

Lin, C., "ROUGE: A Package for Automatic Evaluation of Summaries," Proceedings of the 42nd Annual Meeting of the Association for Computational Linguistics, Jul. 21, 2004, Barcelona, Spain, 8 pages.

Liu, Z. et al., "Video Swin Transformer," Proceedings of the 2022 IEEE/CVF Conference on Computer Vision and Pattern Recognition, Jun. 18, 2022, New Orleans, LA, 10 pages.

Luo, H. et al., "UniVL: A Unified Video and Language Pre-Training Model for Multimodal Understanding and Generation," ArXiv, Sep. 15, 2020, 15 pages.

Papineni, K. et al., "BLEU: a Method for Automatic Evaluation of Machine Translation," Proceedings of the 40th Annual Meeting of the Association for Computational Linguistics, Jul. 2002, Philadelphia, PA, 8 pages.

Seo, P. et al., "End-to-end Generative Pretraining for Multimodal Video Captioning," Proceedings of the 2022 IEEE/CVF Conference on Computer Vision and Pattern Recognition, Jun. 18, 2002, New Orleans, LA, 10 pages.

Vedantam, R. et al., "CIDEr: Consensus-based Image Description Evaluation," ArXiv, Jun. 3, 2015, 17 pages.

* cited by examiner

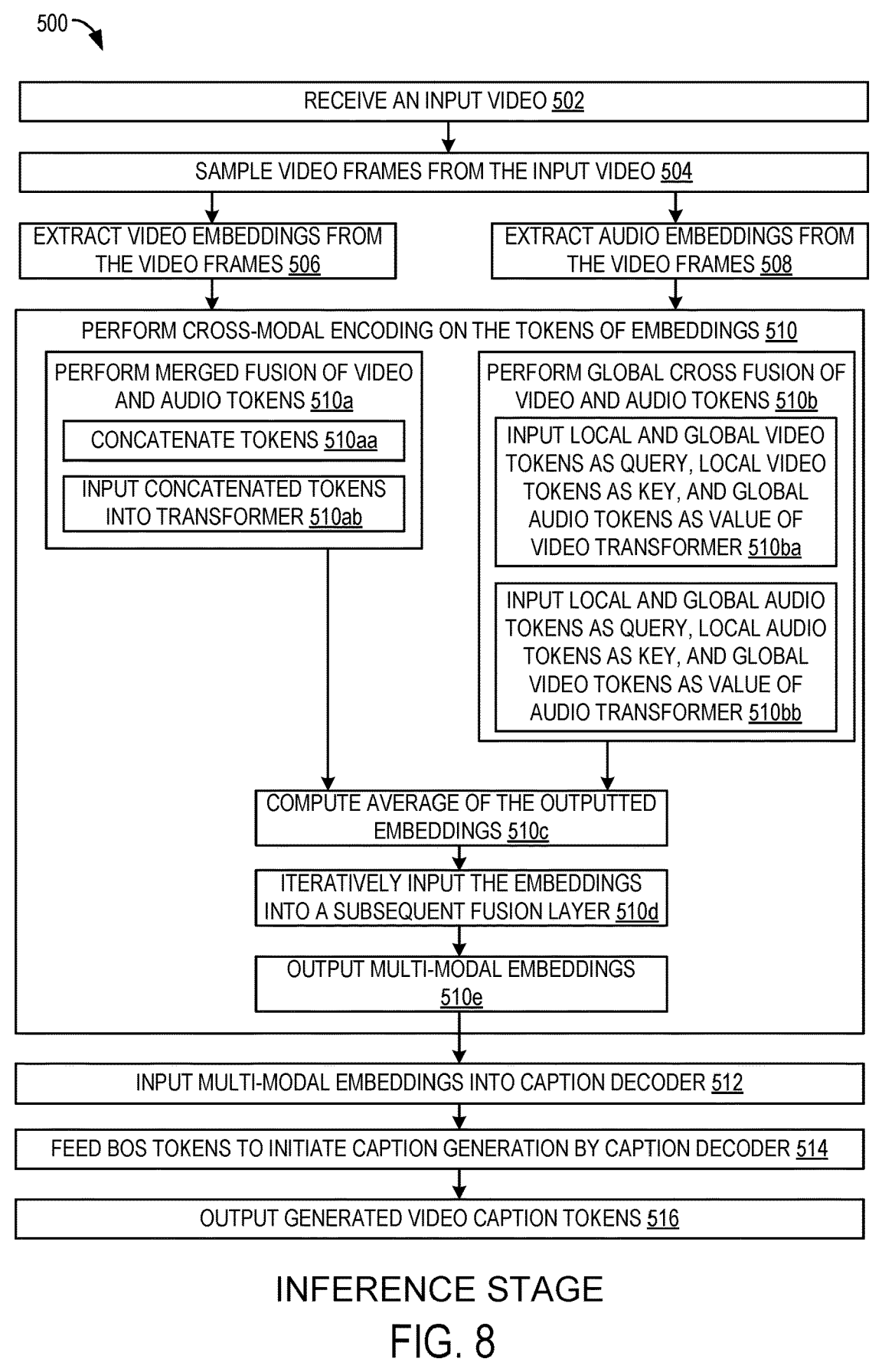

500

RECEIVE AN INPUT VIDEO 502

SAMPLE VIDEO FRAMES FROM THE INPUT VIDEO 504

EXTRACT VIDEO EMBEDDINGS FROM THE VIDEO FRAMES 506

EXTRACT AUDIO EMBEDDINGS FROM THE VIDEO FRAMES 508

PERFORM CROSS-MODAL ENCODING ON THE TOKENS OF EMBEDDINGS 510

PERFORM MERGED FUSION OF VIDEO AND AUDIO TOKENS 510a

CONCATENATE TOKENS 510aa

INPUT CONCATENATED TOKENS INTO TRANSFORMER 510ab

PERFORM GLOBAL CROSS FUSION OF VIDEO AND AUDIO TOKENS 510b

INPUT LOCAL AND GLOBAL VIDEO TOKENS AS QUERY, LOCAL VIDEO TOKENS AS KEY, AND GLOBAL AUDIO TOKENS AS VALUE OF VIDEO TRANSFORMER 510ba

INPUT LOCAL AND GLOBAL AUDIO TOKENS AS QUERY, LOCAL AUDIO TOKENS AS KEY, AND GLOBAL VIDEO TOKENS AS VALUE OF AUDIO TRANSFORMER 510bb

COMPUTE AVERAGE OF THE OUTPUTTED EMBEDDINGS 510c

ITERATIVELY INPUT THE EMBEDDINGS INTO A SUBSEQUENT FUSION LAYER 510d

OUTPUT MULTI-MODAL EMBEDDINGS 510e

INPUT MULTI-MODAL EMBEDDINGS INTO CAPTION DECODER 512

FEED BOS TOKENS TO INITIATE CAPTION GENERATION BY CAPTION DECODER 514

OUTPUT GENERATED VIDEO CAPTION TOKENS 516

INFERENCE STAGE

FIG. 8

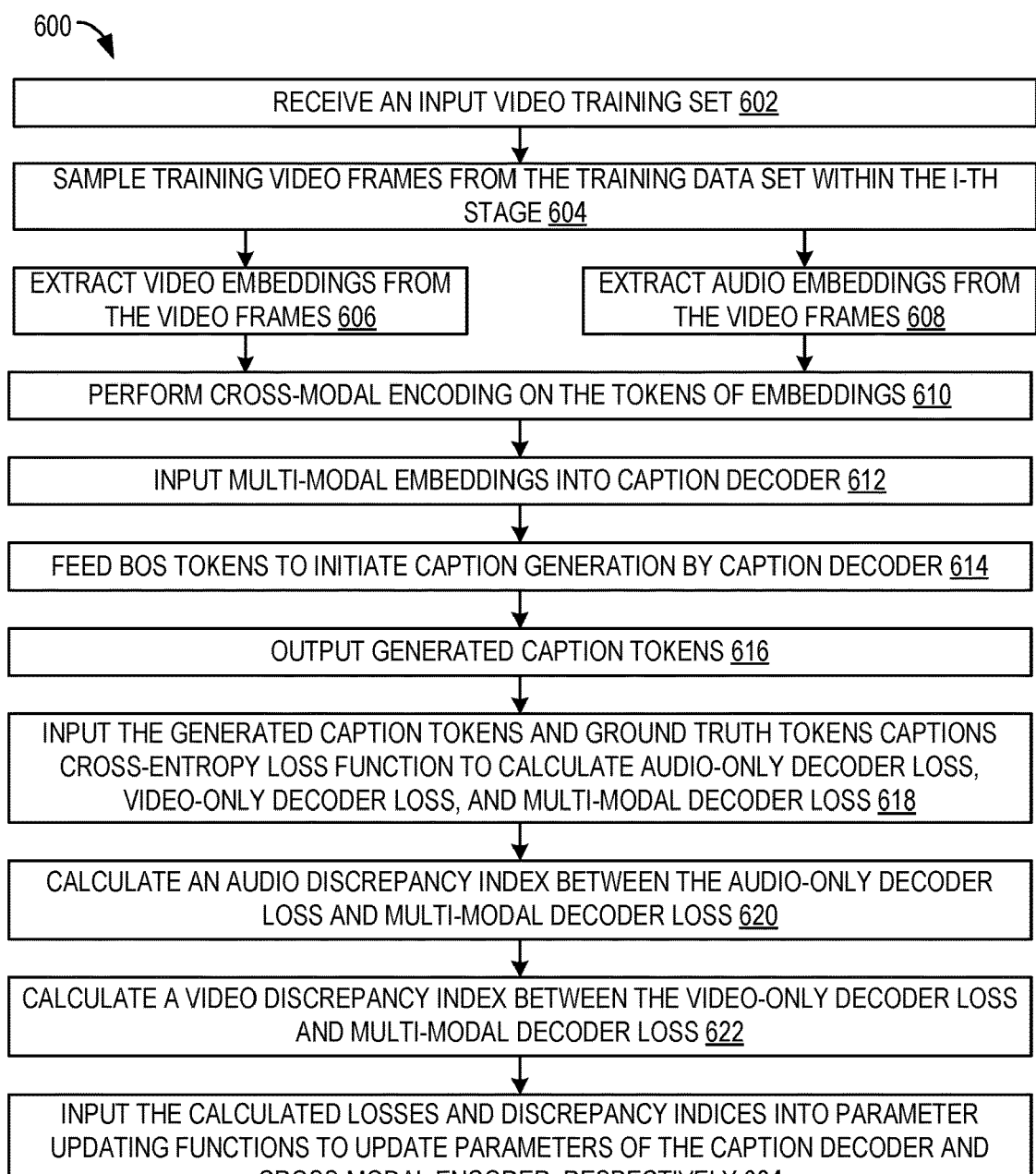

600

RECEIVE AN INPUT VIDEO TRAINING SET 602

SAMPLE TRAINING VIDEO FRAMES FROM THE TRAINING DATA SET WITHIN THE I-TH STAGE 604

EXTRACT VIDEO EMBEDDINGS FROM THE VIDEO FRAMES 606

EXTRACT AUDIO EMBEDDINGS FROM THE VIDEO FRAMES 608

PERFORM CROSS-MODAL ENCODING ON THE TOKENS OF EMBEDDINGS 610

INPUT MULTI-MODAL EMBEDDINGS INTO CAPTION DECODER 612

FEED BOS TOKENS TO INITIATE CAPTION GENERATION BY CAPTION DECODER 614

OUTPUT GENERATED CAPTION TOKENS 616

INPUT THE GENERATED CAPTION TOKENS AND GROUND TRUTH TOKENS CAPTIONS CROSS-ENTROPY LOSS FUNCTION TO CALCULATE AUDIO-ONLY DECODER LOSS, VIDEO-ONLY DECODER LOSS, AND MULTI-MODAL DECODER LOSS 618

CALCULATE AN AUDIO DISCREPANCY INDEX BETWEEN THE AUDIO-ONLY DECODER LOSS AND MULTI-MODAL DECODER LOSS 620

CALCULATE A VIDEO DISCREPANCY INDEX BETWEEN THE VIDEO-ONLY DECODER LOSS AND MULTI-MODAL DECODER LOSS 622

INPUT THE CALCULATED LOSSES AND DISCREPANCY INDICES INTO PARAMETER UPDATING FUNCTIONS TO UPDATE PARAMETERS OF THE CAPTION DECODER AND CROSS-MODAL ENCODER, RESPECTIVELY 624

TRAINING STAGE

FIG. 9

VIDEO CAPTIONING DATASET

| TYPE OF FUSION | BLEU-4 | METEOR | ROUGE-L | CIDEr |
|---|---|---|---|---|
| MERGED FUSION | 19.9 | 23.6 | 49.1 | 210.7 |
| GLOBAL CROSS FUSION | 18.6 | 22.9 | 48.0 | 202.3 |
| LOCAL-GLOBAL MERGED FUSION | 20.6 | 24.2 | 49.6 | 217.0 |

FIG. 10

VIDEO CAPTIONING GENERATION SYSTEM AND METHOD

BACKGROUND

Large-scale pre-training plays a key role in boosting the performance of modern deep learning models for complex vision and language tasks. Among the most challenging vision and language tasks for deep learning models is video description captioning, which includes narration that describes key elements in the video, such as the setting, characters, facial expressions, audio elements, and other details that are important for understanding the videos. Such narration allows a wider audience, including blind or visually impaired viewers, to follow along with the video and understand what is happening on-screen.

According to one technical approach, large video datasets consisting of videos annotated with ground truth text labels could potentially be generated and used to pre-train a deep learning model using supervised learning, such that the trained model would be able to output descriptive narrations of an inference-time input video that describes the elements in the video. However, manually annotating captions for video datasets is costly and not scalable. Thus, existing video captioning datasets are often limited in size. To address this challenge, deep learning models have been recently developed and trained using collected datasets from instructional videos, where transcripts generated by automatic speech recognition are used as text supervision. This has established a new trend of pre-training on large-scale video datasets with text transcripts for video captioning.

However, these training methods do not train the deep learning models to describe audio elements that are not included in the text transcripts. Therefore, existing deep learning models may generate video description captioning which miss important information or context that is conveyed through these audio elements, which may include acoustic effects, music, and speaker identity, for example. This may significantly diminish the accessibility and overall viewing experience of the videos.

SUMMARY

In view of the above, a computing system for video captioning generation is provided. The system comprises a processor and memory of a computing device. The processor is configured to execute a program using portions of memory to receive an input video, extract video frames from the input video, extract video embeddings and audio embeddings from the video frames, including local video tokens and local audio tokens, respectively, input the local video tokens and the local audio tokens into at least a transformer layer of a cross-modal encoder to generate multi-modal embeddings, and generate video captions based on the multi-modal embeddings using a caption decoder.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a flowchart of a method for generating video captions according to an example embodiment of the present disclosure.

FIG. 9 is a flowchart of a method for training a cross-modal encoder and caption decoder using data and model distillation according to an example embodiment of the present disclosure.

FIG. 10 is a table from an ablation study demonstrating the effects on video captioning generation performance of changing the method of processing audio and video tokens in the caption generation module of FIGS. 1 and 2.

DETAILED DESCRIPTION

The popularization of portable devices with cameras has greatly promoted the creation and broadcasting of online videos, which has increased demand for tasks including systems which receive video and text input to generate automatic video captions, including video description or descriptive narration captioning. However, most current automatic video captioning methods ignore the audio modality, which deprive the generated video captions of additional information including acoustic events and speaker identity. In view of these limitations, the present disclosure describes various methods and systems for video captioning generation capable of addressing the aforementioned issues. Such methods and systems are described below in further detail.

Figure 1:
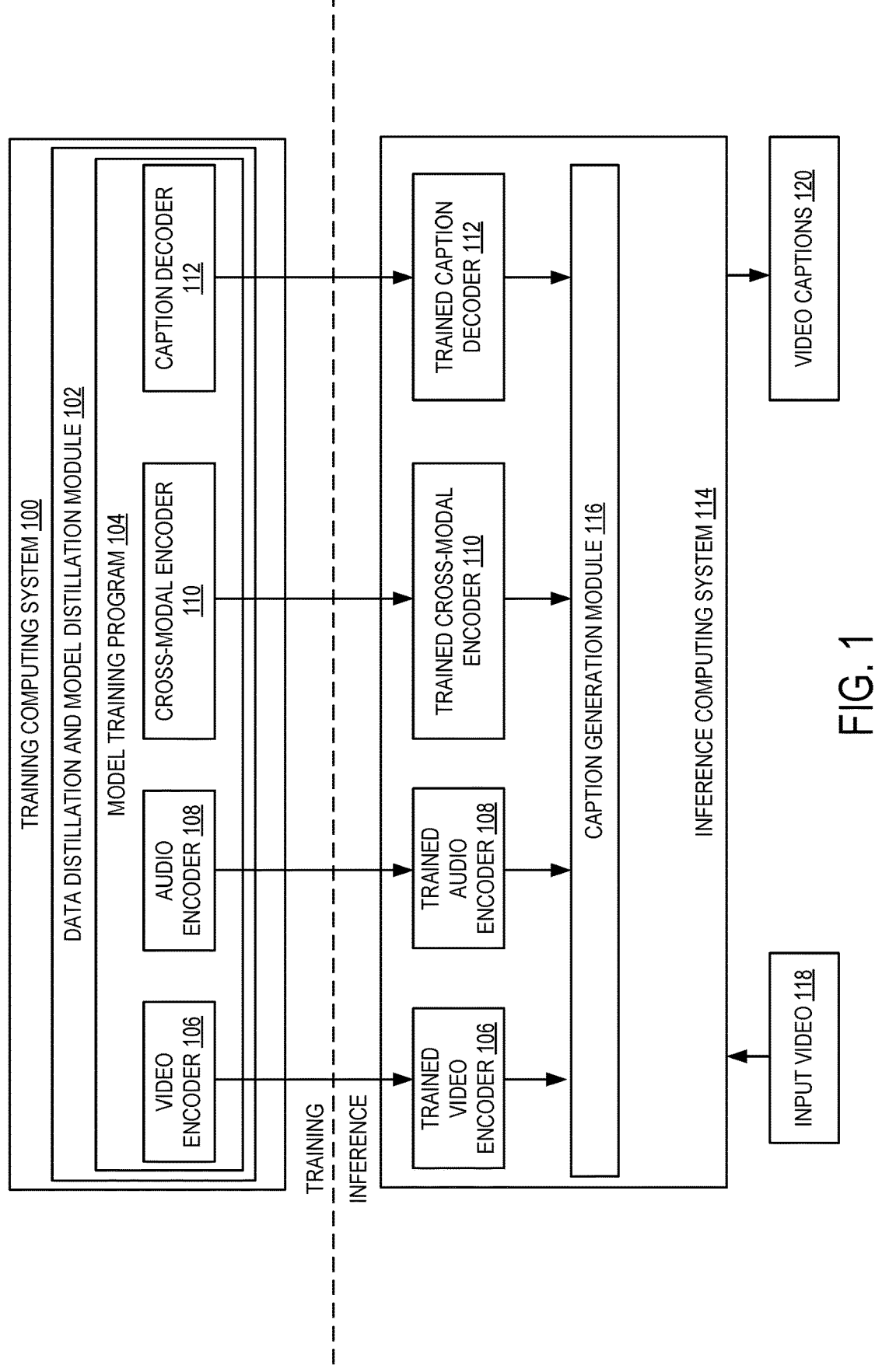
FIG. 1 illustrates a schematic view of a training computing system and an inference computing system according to an example of the present disclosure.

Referring to FIG. 1, a process of generating captions for video frames of an input video 118 using a video captioning generation process is schematically depicted from the training steps to the inference steps. Initially, a training computing system 100 executes a data distillation and model distillation module 102, which includes a model trainer 104 configured to train a video encoder 106, an audio encoder 108, a cross-modal encoder 110, and a caption decoder 112 using training data. The video encoder 106, the audio encoder 108, the cross-modal encoder 110, and the caption decoder 112 trained by the model trainer 104 are then installed on an inference computing system 114 and used by a caption generation module 116 to receive and process an input video 118 to generate video captions 120 corresponding to the input video 118, as explained in further detail below.

Figure 2:
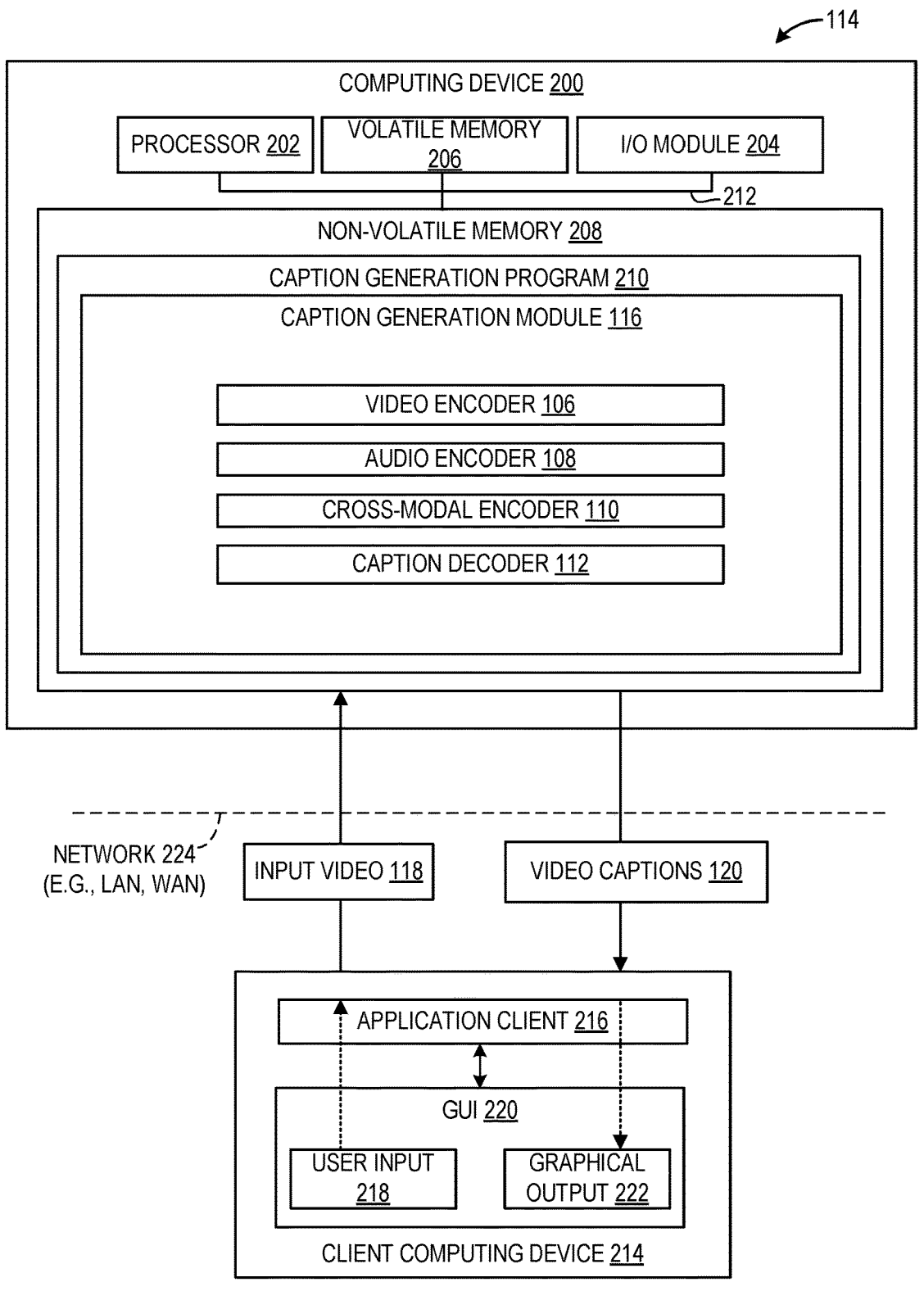
FIG. 2 illustrates a detailed schematic view of the inference computing system of FIG. 1.

Referring to FIG. 2, an inference computing system 114 for generating video captions 120 corresponding to an input video 118 using a video captioning generation process is provided. The inference computing system 114 comprises a computing device 200 including a processor 202, an input/output module 204, volatile memory 206, and non-volatile memory 208 storing a caption generation program 210 comprising the video encoder 106, the audio encoder 108, the cross-modal encoder 110, and the caption decoder 112. A bus 212 may operatively couple the processor 202, the input/output module 204, and the volatile memory 206 to the non-volatile memory 208. The inference computing system 114 is operatively coupled to a client computing device 214 via a network 224. In some examples, the network 224 may take the form of a local area network (LAN), wide area network (WAN), wired network, wireless network, personal area network, or a combination thereof, and can include the Internet. Although the caption generation program 210 is depicted as hosted at one computing device 200, it will be appreciated that the caption generation program 210 may alternatively be hosted across a plurality of computing devices to which the computing device 200 may be communicatively coupled via a network, including network 224.

The processor 202 is configured to store the caption generation program 210 in non-volatile memory 208 that retains instructions stored data even in the absence of externally applied power, such as FLASH memory, a hard disk, read only memory (ROM), electrically erasable programmable memory (EEPROM), etc. The instructions include one or more programs, including the caption generation program 210, and data used by such programs sufficient to perform the operations described herein. In response to execution by the processor 202, the instructions cause the processor 202 to execute the caption generation program 210, which includes the video encoder 106, the audio encoder 108, the cross-modal encoder 110, and the caption decoder 112.

The processor 202 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. Volatile memory 206 can include physical devices such as random access memory (RAM), static random access memory (SRAM), dynamic random access memory (DRAM), etc., which temporarily stores data only for so long as power is applied during execution of programs. Non-volatile memory 208 can include physical devices that are removable and/or built in, such as optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology.

In one example, a user operating the client computing device 214 may send an input video 118 to the computing device 200. The processor 202 of the computing device 200 is configured to receive the input video 118 from the user and execute the caption generation program 210 to generate video captions 120 which correspond to the input video 118. The processor 202 then returns the video captions 120 to the client computing device 214.

The client computing device 214 may execute an application client 216 to send the input video 118 to the computing device 200 upon detecting a user input 218 and subsequently receive the video captions 120 from the computing device 200. The application client 216 may be coupled to a graphical user interface 220 of the client computing device 214 to display a graphical output 222 of the video captions 120.

Although not depicted here, it will be appreciated that the training computing system 100 that executes the data distillation and model distillation module 102 of FIG. 1 can be configured similarly to computing device 200.

Figure 3:
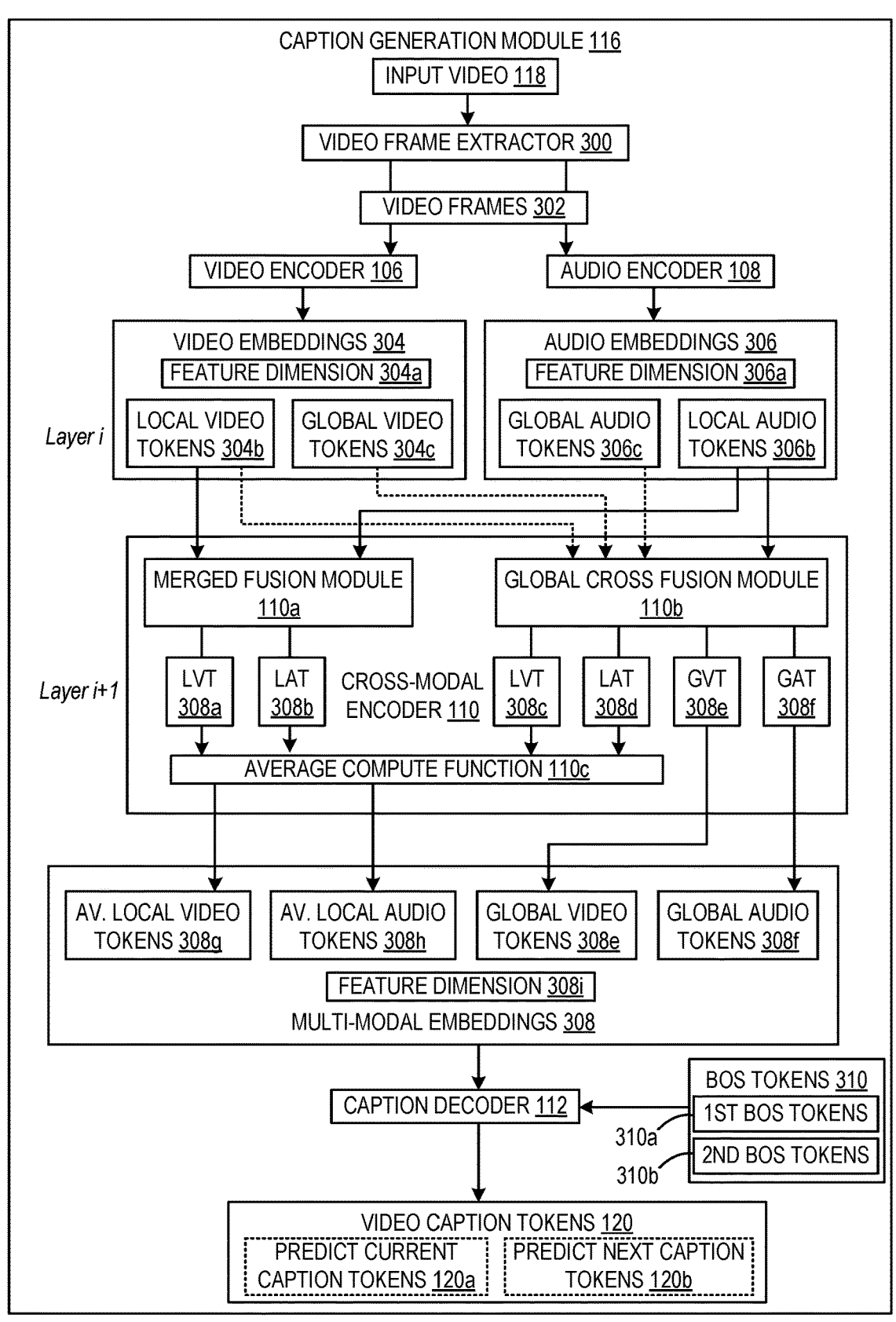
FIG. 3 illustrates a detailed schematic view of the caption generation module of the inference computing system of FIG. 1.

Referring to FIG. 3, operations of the caption generation module 116 of FIGS. 1 and 2 are described in detail. An input video 118 is received. A video frame extractor 300 extracts video frames 302 from the input video 118. A sequence of video embeddings 304 are extracted from the video frames 302 using a video encoder 106, which may be a video transformer. However, it will be appreciated that the video encoder 106 may be configured using alternative deep learning model architectures, including convolutional neural networks. The extracted video embeddings 304 include a feature dimension 304*a*, local video tokens 304*b*, and global video tokens 304*c*. The global video tokens 304*c* are global representations of the video frames 302 of the input video 118 which capture high-level concepts, such as people gathering on a street.

A sequence of audio embeddings 306 are extracted from associated audio spectrograms of the video frames 302 using an audio encoder 108, which may be an audio transformer. However, it will be appreciated that the audio encoder 108 may be configured using alternative deep learning model architectures, including convolutional neural networks. The audio embeddings 306 corresponding to the video embeddings 304 may alternatively be extracted from a file separate from the input video 118. The extracted audio embeddings 306 include a feature dimension 306*a*, local audio tokens 306*b*, and global audio tokens 306*c*. The global audio tokens 306*c* are global representations of the audio of the input video 118 which capture high-level concepts, such as sounds of laughter.

The video embeddings 304 and the audio embeddings 306 are inputted into a cross-modal encoder 110 to generate multi-modal embeddings 308. The cross-modal encoder 110 includes a transformer layer implementing Multi-Head Attention (MHA) and a Feed-Forward Block (FFB). In the example of FIG. 3, the cross-modal encoder 110 comprises a merged fusion module 110*a* and a global cross fusion module 110*b* which performs merged fusion and global cross fusion, respectively. The number of transformer layers in the cross-modal encoder 110 is not particularly limited, and may be three or more.

Figure 4:
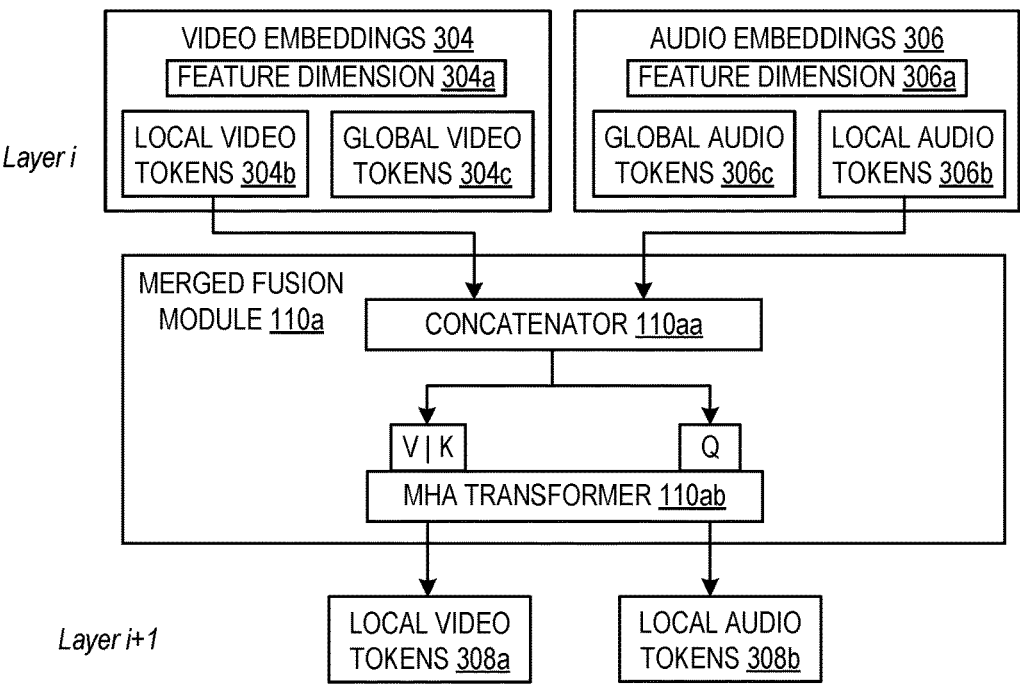
FIG. 4 illustrates a detailed schematic view of the merged fusion module of the cross-modal encoder of FIG. 3.

Turning to FIG. 4, operations of the merged fusion module 110*a* of the cross-modal encoder 110 are described. The concatenator 110*aa* of the merged fusion module 110*a* concatenates the local video tokens 304*b* and the local audio tokens 306*b* together, and then inputs the concatenated video tokens and audio tokens into transformer blocks of a MHA transformer 110*ab* of the merged fusion module 110*a*. In the transformer blocks, each transformer layer has two modality-specific transformers, and different modalities exchange information via cross attention. In a given transformer layer with a first transformer and a second transformer, the first transformer has keys and values derived from the local video tokens 304*b*, while the queries are derived from the local audio tokens 306*b*. Conversely, the second transformer has keys and values derived from the local audio tokens 306*b*, while the queries are derived from the local video tokens 304*b*. The merged fusion module 110*a* subsequently outputs merged local video tokens 308*a* and merged local audio tokens 308*b*.

Figure 5:
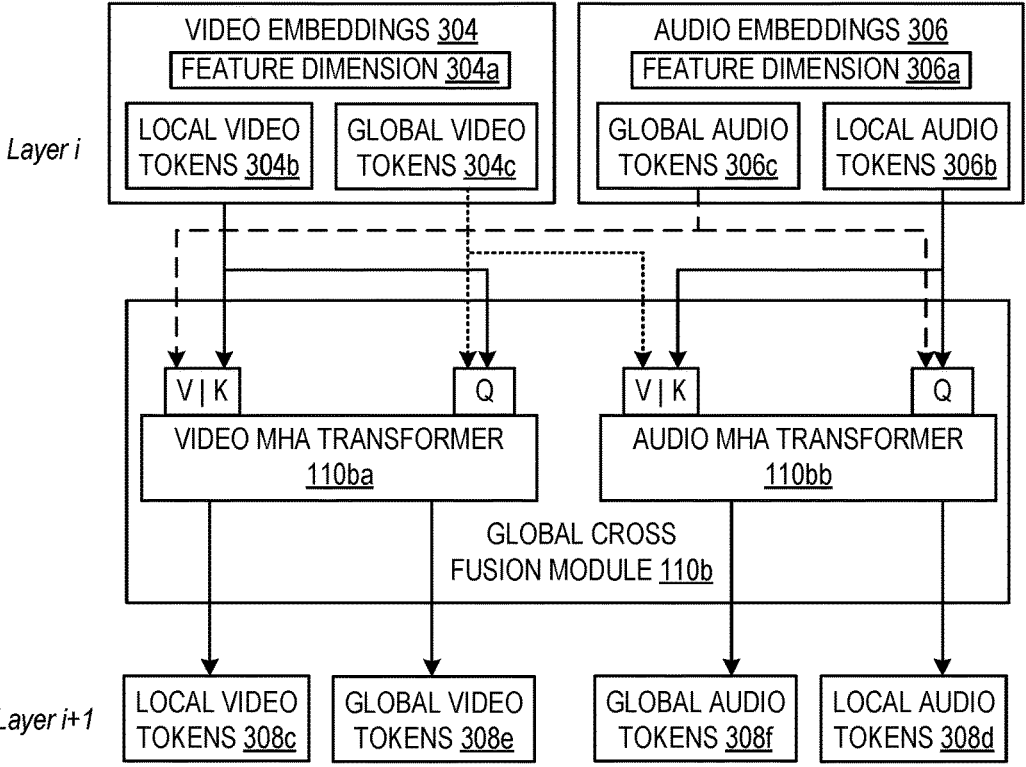
FIG. 5 illustrates a detailed schematic view of the global cross fusion module of the cross-modal encoder of FIG. 3.

Turning to FIG. 5, operations of the global cross fusion module 110*b* of the cross-modal encoder 110 are described. The global cross fusion module 110*b* comprises a video MHA transformer 110*ba* and an audio MHA transformer 110*bb*. The video MHA transformer 110*ba* receives the local video tokens 304*b* and global video tokens 304*c* as queries, the local video tokens 304*b* as keys, and the global audio tokens 306*c* as values, and subsequently outputs fused local video tokens 308*c* and fused global video tokens 308*e*. The audio MHA transformer 110*bb* receives the local audio tokens 306*b* and the global audio tokens 306*c* as queries, the local audio tokens 306*b* as keys, and the global video tokens 304*c* as values, and subsequently outputs fused local audio tokens 308*d* and fused global audio tokens 308*f*. Accordingly, with the global cross fusion module 110*b*, cross-modal attention flow is funneled into the global video tokens 304*c* and the global audio tokens 306*c*, and the local video tokens 304*b* and local audio tokens 306*b* are used for intra-modal attention. By using the global video tokens 304*c* as context, as opposed to using local video tokens 304*b* as context, high-level concepts can be used in the generation of video captions.

Returning to FIG. 3, the merged local video tokens 308*a* and merged local audio tokens 308*b* outputted by the merged fusion module 110*a*, and the fused local video tokens 308*c* and fused local audio tokens 308*d* outputted by the global cross fusion module 110*b* are inputted into an average compute function 110*c*, which averages the merged local video tokens 308*a* and the fused local video tokens 308*c* to output averaged local video tokens 308*g*, and averages the merged local audio tokens 308*b* and the fused local audio tokens 308*d* to output averaged local video tokens 308*h*. These averaged local tokens 308*g*, 308*h* may be iteratively inputted into a subsequent fusion layer of the cross-modal encoder 110 (indicated by 'Layer i+1') until the final multi-modal embeddings 308 are outputted, comprising the averaged local video tokens 308*g*, the averaged local audio tokens 308*h*, the fused global video tokens 308*e*, the fused global audio tokens 308*f*, and a feature dimension 308*i*. Accordingly, the local features captured by the local tokens 304*b*, 304*c*, which may include words in the speech or objects in a video frame, and global features captured by the global tokens 306*b*, 306*c*, which may include sounds of laughter or people gathering on a street, may be captured by combining merged fusion and global cross fusion in one cross-modal encoder 110.

A caption decoder 112 receives input of the multi-modal embeddings 308 to generate and output video caption tokens 120 auto-regressively based on the multi-modal embeddings 308. Caption generation may be initiated by inputting one or more distinct Beginning of Sentence (BOS) tokens 310 into the caption decoder 112. The BOS tokens 310 may comprise a first BOS token 310*a* which initiates the prediction of current video caption tokens 120*a*, and a second BOS token 310*b* which initiates the prediction of next video caption tokens 120*b*. The caption decoder 112 may be implemented as a transformer. The number of transformer layers in the caption decoder 112 is not particularly limited, and may be three or more.

Figure 6:
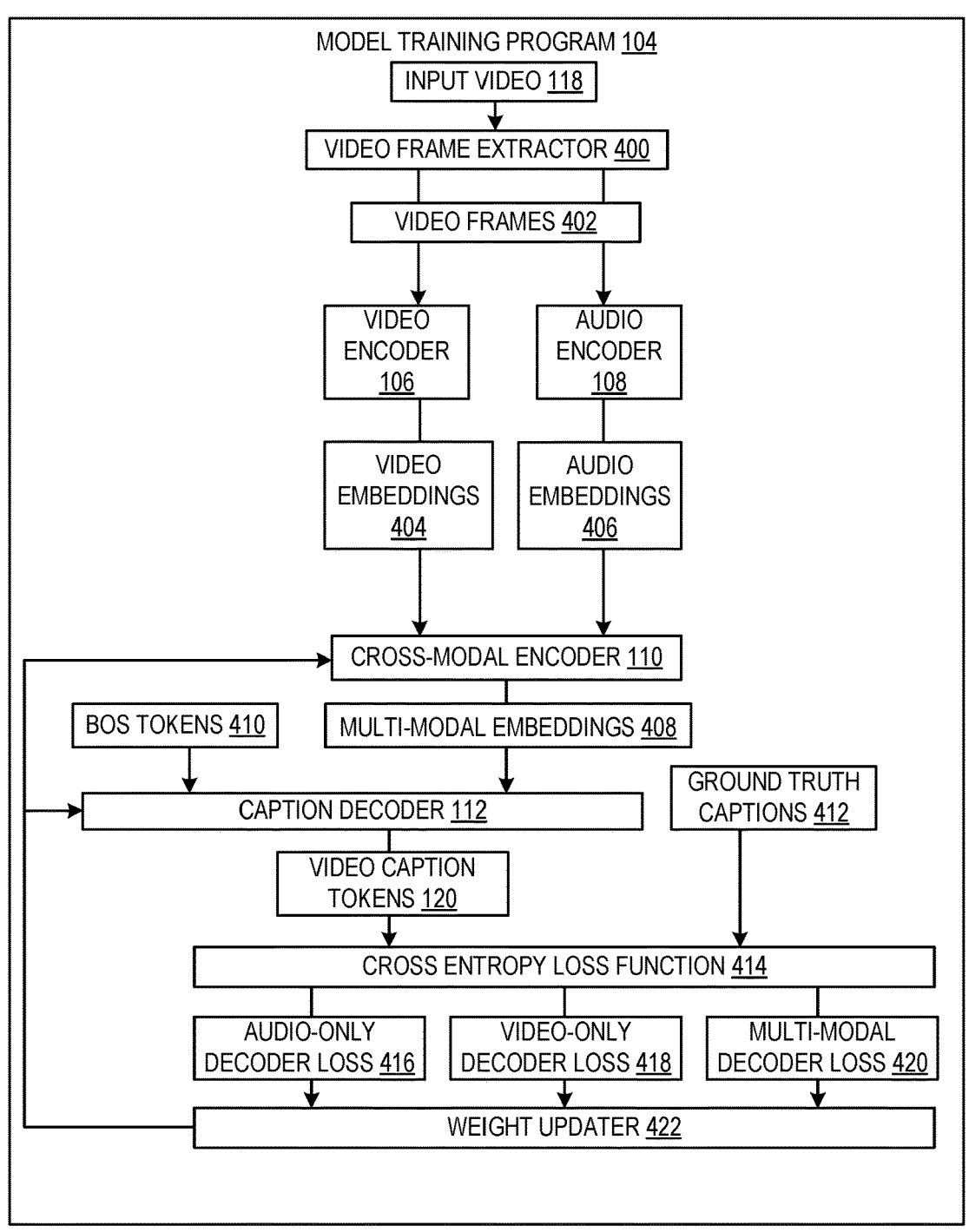
FIG. 6 illustrates a detailed schematic view of the model training program of the training computing system of FIG. 1.

Referring to FIG. 6, operations of the data distillation and model distillation module 102 and model training program 104 of FIG. 1 for training a cross-modal encoder 110 and a caption decoder 112 using training data are described in detail. Since the features of the model training program 104 are similar to the caption generation module 116, including the video extractor 400 configured to extract video frames 402, the video encoder 106 configured to output video embeddings 404, the audio encoder 108 configured to output audio embeddings 406, the cross-modal encoder 110 configured to output multi-modal embeddings 408, and the caption decoder 112 configured to output video caption tokens 120 based on the multi-modal embeddings 408 and the BOS tokens 410, the detailed description thereof is abbreviated here. Like parts in this example are numbered similarly to the caption generation module 116 and share their functions, and will not be described again except as below for the sake of brevity.

The video caption tokens 120 and the ground truth captions 412 are inputted into a cross-entropy loss function 414, which calculates an audio-only decoder loss 416, a video-only decoder loss 418, and a multi-modal decoder loss 420 based on the video caption tokens 120 and the ground truth captions 412. The audio-only decoder loss 416 is calculated by inputting video embeddings 404 set to all-zeros and inputting the audio embeddings 406 of the video frames 402 into the cross-modal encoder 110 to generate audio-only mono-modal embeddings 408, inputting the audio-only mono-modal embeddings 408 into the caption decoder 112 to generate video caption tokens 120, and then using the cross-entropy loss function 414 to calculate an audio-only decoder loss 416 against the ground truth captions 412. The audio-only decoder loss 416 ($L_a$) may be defined by the following formula:

$$L_a = \mathcal{L}(g_{\theta'}(f_\theta(\gamma^a, 0)), y).$$

Here, 0 represents the video embeddings 404 set to all-zeros, $\gamma^a$ represents the audio-only embeddings 406, $f_\theta$ represents the cross-modal encoder 110, $g_{\theta'}$ represents the caption decoder 112, y represents the ground truth captions 412, and $\mathcal{L}$ represents the cross-entropy loss function 414.

The video-only decoder loss 418 is calculated by inputting audio embeddings 406 set to all-zeros and inputting the video embeddings 404 of the video frames 402 into the cross-modal encoder 110 to generate video-only mono-modal embeddings 408, inputting the video-only mono-modal embeddings 408 into the caption decoder 112 to generate video caption tokens 120, and then using the cross-entropy loss function 414 to calculate a video-only decoder loss 418 against the ground truth captions 412. The video-only decoder loss 418 ($L_v$) may be defined by the following formula:

$$L_v = \mathcal{L}(g_{\theta'}(f_\theta(0, \gamma^v)), y).$$

Here, 0 represents the audio embeddings 406 set to all-zeros, $\gamma^v$ represents the video-only embeddings 404, $f_\theta$ represents the cross-modal encoder 110, $g_{\theta'}$ represents the caption decoder 112, y represents the ground truth captions 412, and $\mathcal{L}$ represents the cross-entropy loss function 414.

The multi-modal decoder loss 420 is calculated by inputting audio embeddings 406 and the video embeddings 404 of the video frames 402 into the cross-modal encoder 110 to generate multi-modal embeddings 408, inputting the multi-modal embeddings 408 into the caption decoder 112 to generate video caption tokens 120, and then using the cross-entropy loss function 414 to calculate the multi-modal decoder loss 420 against the ground truth captions 412. The multi-modal decoder loss 420 (L) may be defined by the following formula:

$$L = \mathcal{L}(g_{\theta'}(f_\theta(\gamma^a, \gamma^v)), y).$$

Here, $\gamma^a$ represents the audio embeddings 406, $\gamma^v$ represents the video-only embeddings 404, $f_\theta$ represents the cross-modal encoder 110, $g_\theta$, represents the caption decoder 112, y represents the ground truth captions 412, and $\mathcal{L}$ represents the cross-entropy loss function 414.

The weight updater 422 may calculate an audio discrepancy index to measure a discrepancy between the audio-only decoder loss 416 and the multi-modal decoder loss 420. Likewise, the weight updater 422 also calculates a video discrepancy index to measure a discrepancy between the video-only decoder loss 418 and the multi-modal decoder loss 420. The calculated audio discrepancy index and the video discrepancy index are used to update the training weights of the audio-only decoder loss 416 and the video-only decoder loss 418 over iterations. The audio discrepancy index $G_a$ and video discrepancy index $G_v$ may be defined by the formulas $G_a=(L_a-L)^2$ and $G_v=(L_v-L)^2$, respectively, in which $L_a$ represents the audio-only decoder loss 416, $L_v$ represents the video-only decoder loss 418, and L represents the multi-modal decoder loss 420.

The weight updater 422 uses the calculated cross-entropy losses 416, 418, 420 and the discrepancy indices to update the trainable parameters of the cross-modal encoder 110 and the caption decoder 112 through gradient back-propagation. When the video discrepancy index is high, a higher weight is assigned for the video modalities of the cross-modal encoder 110 and the caption decoder 112, so that more attention is given to the video modality and overspecialization to the audio modality is mitigated. When the audio discrepancy index is high, a higher weight is assigned for the audio modalities of the cross-modal encoder 110 and the caption decoder 112, so that more attention is given to the audio modality and overspecialization to the video modality is mitigated.

As optimization progresses over iterations and the video discrepancy index and the audio discrepancy index change over time, the weights assigned to the video modalities and the audio modalities are dynamically adjusted to increase the weights of the underfitted modalities. The process of calculating the loss and parameters for the cross-modal encoder 110 and the caption decoder 112 is repeated for every stage, so that learnings acquired in previous stages may be inherited and trained. Thus, the cross-modal encoder 110 and the caption decoder 112 are trained from weights learned in previous training stages.

The weight of the audio-only decoder loss 416 $L_a$ and the weight of the video-only decoder loss 418 $L_v$ may be guided based on whether the modality is well utilized by the model $L_{pretrain}=L+w_a L_a+w_v L_2$, where $w_a$ and $w_v$ are the weight of the audio-only decoder loss 416 ($L_a$) and the weight of the video-only decoder loss 418 ($L_v$), respectively. The weight $w_a$ of the audio-only decoder loss 416 may be updated over iterations as follows:

$$\tilde{w}_a^{(t)} = \beta w_a^{(t-1)} + (1-\beta)\hat{w}_a^{(t)}$$

$$\hat{w}_a^{(t)} = \frac{\exp(\alpha G_a^{(t)})}{\Sigma_{a'}\exp(\alpha G_{a'}^{(t)})}$$

Here, $\beta \in (0,1)$ is a smoothing hyperparameter, t is the iteration number, $\tilde{w}_a^{(t)}$ is obtained using a softmax function over the gap between each audio-only decoder loss 416 and the multi-modal decoder loss 420 of the current iteration, and $\alpha>0$ is a temperature hyperparameter. If the audio discrepancy index $G_a$ is large for the audio modality on the pre-training dataset, a higher weight $w_a$ of the audio-only decoder loss 416 is assigned for the model $L_{pretrain}=L+w_a L_a+w_v L_v$. When optimization progresses and the audio discrepancy index $G_a$ changes over time, the weight $w_a$ of the audio-only decoder loss 416 may be dynamically adjusted to increase the weight of the underfitted modality.

Likewise, the weight $w_v$ of the video-only decoder loss 418 may be updated over iterations as follows:

$$\tilde{w}_v^{(t)} = \beta w_v^{(t-1)} + (1-\beta)\hat{w}_v^{(t)}$$

$$\hat{w}_v^{(t)} = \frac{\exp(\alpha G_v^{(t)})}{\Sigma_{v'}\exp(\alpha G_{v'}^{(t)})}$$

Here, $\beta \in (0,1)$ is a smoothing hyperparameter, t is the iteration number, $\tilde{w}_v^{(t)}$ is obtained using a softmax function over the gap between each video-only decoder loss 418 and the multi-modal decoder loss 420 of the current iteration, and $\alpha>0$ is a temperature hyperparameter. If the video discrepancy index $G_v$ is large for the video modality on the pre-training dataset, a higher weight $w_v$ of the video-only decoder loss 418 is assigned for the model $L_{pretrain}=L+ w_a L_a+w_v L_v$. When optimization progresses and the video discrepancy index $G_v$ changes over time, the weight $w_v$ of the video-only decoder loss 418 may be dynamically adjusted to increase the weight of the underfitted modality.

Although FIGS. 1-6 depict the video encoder 106, the audio encoder 108, the cross-modal encoder 110, and the caption decoder 112 as separate modules, different combinations of these modules can be implemented within a single video captioning generation process.

Figure 7A:
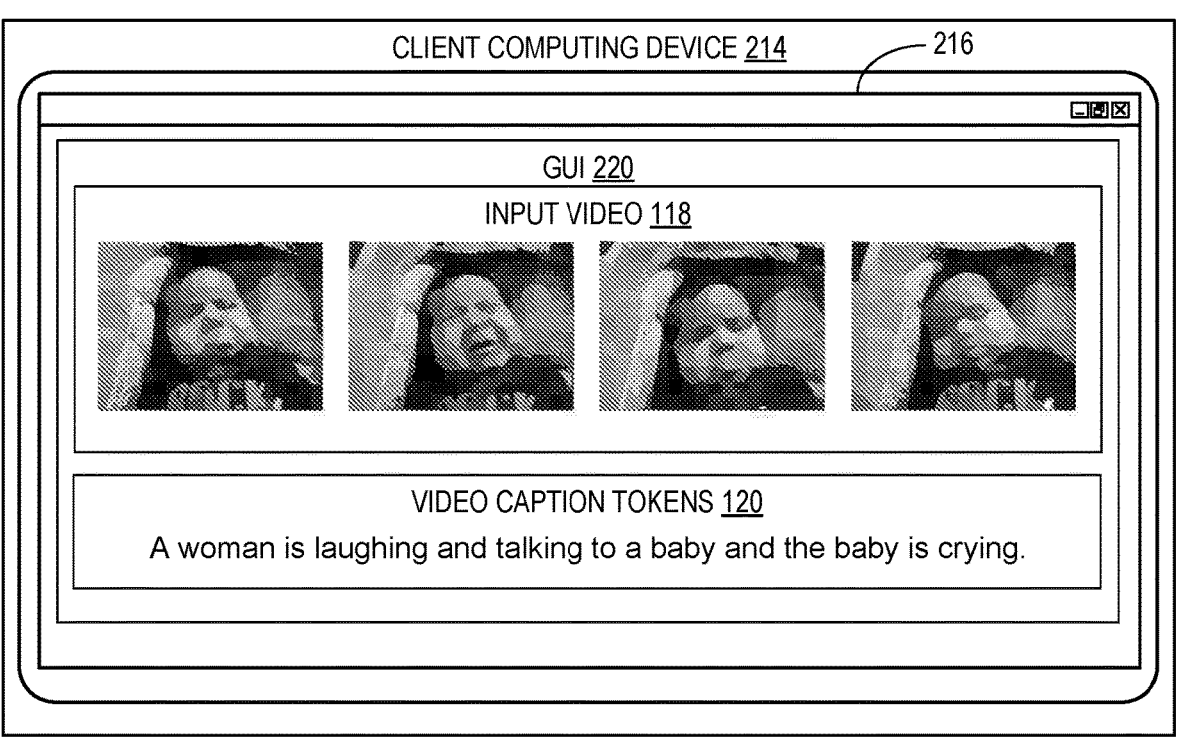
FIGS. 7A and 7B are example illustrations of an application client showing input videos and generated video caption tokens corresponding to the input videos, as performed by the inference computing system of FIG. 1.

Referring to FIG. 7A, a schematic view is shown of an application client 216 for a video rendering program, which can be implemented on a client computing device 214 such as the one shown in FIG. 2. The application client 216 receives input containing an input video 118 through a graphical user interface 220. In response, the application client 216 generates and outputs video captions 120 corresponding to the input video 118 on the graphical user interface 220. In this example, the input video 118 is a video of a baby, and the video captions 120 correspond to the input video 118. In this example, the video captions 120 state that a woman is laughing and talking to a baby, and the baby is crying.

Figure 7B:
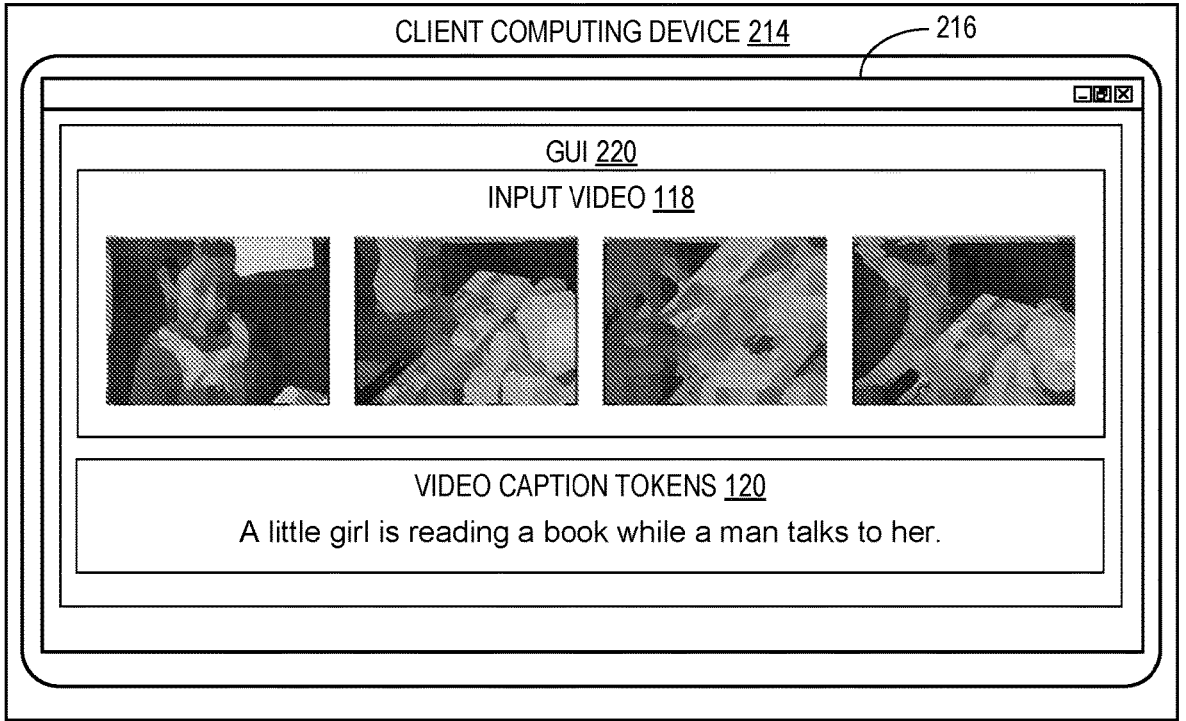

FIG. 7B shows a schematic view of the application client 216 for the video rendering program outputting video captions 120 corresponding to an input video 118 of a girl pointing to pictures in a book. In this example, the video captions 120 state that a little girl is reading a book while a man talks to her.

FIG. 8 illustrates a flowchart of a computerized method 500 for generating captions for video frames of an input video using a video captioning generation process. The following description of computerized method 500 is provided with reference to the software and hardware components described above and shown in FIGS. 1 to 8. It will be appreciated that computerized method 500 also may be performed in other contexts using other suitable hardware and software components.

At step 502, an input video is received from a user. At step 504, video frames are sampled from the input video. At step 506, a sequence of video embeddings are extracted from the video frames using a video encoder. The extracted video embeddings may include a feature dimension, local video tokens, and global video tokens. The global video tokens may be global representations of the images of the input video which capture high-level concepts, such as people gathering on a street.

At step 508, a sequence of audio embeddings are extracted from associated audio spectrogram of the video frames using an audio encoder, which may be an audio transformer. The extracted audio embeddings may include a feature dimension, local audio tokens, and global audio tokens. The global audio tokens may be global representations of the audio of the input video which capture high-level concepts, such as sounds of laughter.

At step 510, cross-modal encoding is performed on the tokens of the extracted embeddings. Step 510 may include a step 510a of performing merged fusion of the video tokens and audio tokens, and a step 510b of performing global cross fusion of the video tokens and audio tokens. Step 510a includes a step 510aa of concatenating the local video tokens and the local audio tokens together, and a step 510ab of inputting the concatenated video tokens and concatenated audio tokens into transformer blocks which merge the concatenated video tokens and concatenated audio tokens. The merged local video tokens and merged local audio tokens are subsequently outputted.

Step 510b includes a step 510ba of receiving the local video tokens and global video tokens as queries, the local video tokens as keys, and the global audio tokens as the values of a video transformer, and subsequently outputting fused local video tokens and fused global video tokens, and a step 510bb of receiving the local audio tokens and the global audio tokens as queries, the local audio tokens as keys, and the global video tokens as the values of an audio transformer, and subsequently outputting fused local audio tokens and fused global audio tokens.

Step 510 includes a step 510c of averaging the merged local video tokens and the fused local video tokens to output averaged local video tokens, and averaging the merged local audio tokens and the fused local audio tokens to output averaged local video tokens. At step 510d, the averaged local tokens are iteratively inputted into a subsequent fusion layer of the cross-modal encoder, until step 510e when the final multi-modal embeddings are outputted, comprising the averaged local video tokens, the averaged local audio tokens, the fused global video tokens, the fused global audio tokens, and a feature dimension.

At step 512, the multi-modal embeddings are inputted into a caption decoder. At step 514, distinct BOS tokens are inputted into the caption decoder to initiate the caption generation. The BOS may comprise a first BOS token which initiates a prediction of current video caption tokens, and a second BOS token which initiates a prediction of next video caption tokens. At step 516, the generated video caption tokens are outputted auto-regressively.

FIG. 9 illustrates a flowchart of a computerized method 600 for training a cross-modal encoder and a caption decoder using data and model distillation. The following description of computerized method 600 is provided with reference to the software and hardware components described above and shown in FIGS. 1 to 8. It will be appreciated that computerized method 600 also may be performed in other contexts using other suitable hardware and software components.

At step 602, an input video is received from a user. At step 604, video frames are sampled from the input video. At step 606, a sequence of video embeddings are extracted from the video frames using a video encoder. At step 608, a sequence of audio embeddings are extracted from associated audio spectrograms of the video frames using an audio encoder, which may be an audio transformer.

At step 610, cross-modal encoding is performed on the tokens of the extracted embeddings. At step 612, the multi-modal embeddings are inputted into a caption decoder. At step 614, distinct BOS tokens are inputted into the caption decoder to initiate the caption generation. At step 616, the generated video caption tokens are outputted auto-regressively.

At step 618, an audio-only decoder loss, a video-only decoder loss, and a multi-modal decoder loss are calculated based on the generated video caption tokens and the ground truth captions. The audio-only decoder loss is calculated by inputting video embeddings set to all-zeros and inputting the audio embeddings of the video frames into the cross-modal encoder to generate audio-only mono-modal embeddings, inputting the audio-only mono-modal embeddings into the caption decoder to generate video caption tokens, and then using the cross-entropy loss function to calculate an audio-only decoder loss against the ground truth captions.

The video-only decoder loss is calculated by inputting audio embeddings set to all-zeros and inputting the video embeddings of the video frames into the cross-modal encoder to generate video-only mono-modal embeddings, inputting the video-only mono-modal embeddings into the caption decoder to generate video caption tokens, and then using the cross-entropy loss function to calculate a video-only decoder loss against the ground truth captions.

The multi-modal decoder loss is calculated by inputting audio embeddings and the video embeddings of the video frames into the cross-modal encoder to generate multi-modal embeddings, inputting the multi-modal embeddings into the caption decoder to generate video caption tokens, and then using the cross-entropy loss function to calculate the multi-modal decoder loss against the ground truth captions.

At step 620, an audio discrepancy index is calculated to measure a discrepancy between the audio-only decoder loss and the multi-modal decoder loss. Likewise, at step 622, a video discrepancy index is calculated to measure a discrepancy between the video-only decoder loss and the multi-modal decoder loss.

At step 624, the calculated cross-entropy losses and the discrepancy indices are used to update the trainable parameters of the cross-modal encoder and the caption decoder through gradient back-propagation. When the video discrepancy index is high, a higher weight is assigned for the video modalities of the cross-modal encoder and the caption decoder, so that more attention is given to the video modality and overspecialization to the audio modality is mitigated. When the audio discrepancy index is high, a higher weight is assigned for the audio modalities of the cross-modal encoder and the caption decoder, so that more attention is given to the audio modality and overspecialization to the video modality is mitigated. Steps 618 through 624 are subsequently repeated for each stage.

FIG. 10 is a table from an ablation study demonstrating the effects on video captioning generation performance of changing the method of processing audio and video tokens by the cross-modal decoder of FIGS. 1 to 5. Four metrics, BLEU-4 (B), METEOR (M), ROUGE-L (R), and CIDEr (C), were used to evaluate the video captioning generation performance of the caption generation program on the YouCook2 video captioning dataset, which contains 2,000 cooking videos with 15,400 video clips.

When the cross-modal encoder only performed merged fusion of the local video tokens and local audio tokens using the merged fusion module, and omitted the global cross fusion module, the video captioning generation performance as measured by each of the four metrics was 19.9 for BLEU-4, 23.6 for METEOR, 49.1 for ROUGE-L, and 210.7 for CIDEr.

When the cross-modal encoder only performed global cross fusion of the local tokens and global tokens using the global cross fusion module, and omitted the merged fusion module, the video captioning generation performance as measured by each of the four metrics was 18.6 for BLEU-4, 22.9 for METEOR, 48.0 for ROUGE-L, and 202.3 for CIDEr.

On the other hand, when the cross-modal encoder implemented both the merged fusion module and the global cross fusion module as described in FIG. 3, the video captioning generation performance as measured by each of the four metrics was 20.6 for BLEU-4, 24.2 for METEOR, 49.6 for ROUGE-L, and 217.0 for CIDEr, which indicated higher performance than in the implementations where the cross-modal encoder omitted the merged fusion module or the global cross fusion module. Therefore, the present inventors concluded that implementing both the merged fusion module and the global cross fusion module in the cross-modal encoder optimized video captioning generation performance as measured by the above-mentioned metrics.

The above-described system and methods use an effective scheme to use a cross-modal encoder, so that models used for video captioning generation may learn to include important information conveyed by audio elements in the video. Accordingly, excellent accessibility and overall viewing experience can be achieved by generating video description captioning which describes audio elements which may convey important information or context, including acoustic effects and speaker identity.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
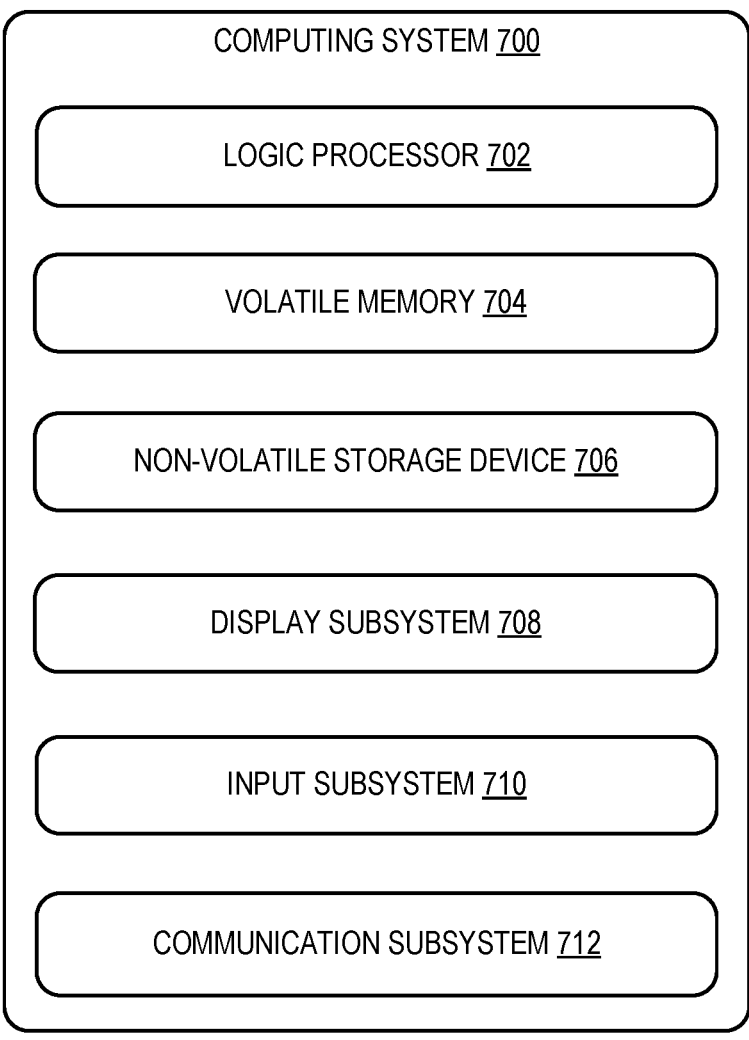
FIG. 11 shows an example computing environment of the present disclosure.

FIG. 11 schematically shows a non-limiting embodiment of a computing system 700 that can enact one or more of the methods and processes described above. Computing system 700 is shown in simplified form. Computing system 700 may embody the training computing system 100, inference computing system 114, computing device 200, and the client computing device 214 described above and illustrated in FIGS. 1 and 2, respectively. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 11.

Logic processor 702 includes one or more physical devices configured to execute instructions. For example, the logic processor 702 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor 702 may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the logic processor 702 may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory, semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem 710 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional description of the subject matter of the present disclosure. One aspect provides a video captioning generation system comprising a processor and memory of a computing device, the processor being configured to execute a program using portions of memory to receive an input video, extract video frames from the input video, extract video embeddings and audio embeddings from the video frames, including local video tokens and local audio tokens, respectively, input the local video tokens and the local audio tokens into at least a transformer layer of a cross-modal encoder to generate multi-modal embeddings, and generate video captions based on the multi-modal embeddings using a caption decoder.

In this aspect, additionally or alternatively, the generation of video captions may be initiated by inputting one or more Beginning of Sentence (BOS) tokens into the caption decoder.

In this aspect, additionally or alternatively, the BOS tokens may include a first BOS token configured to initiate a prediction of current video caption tokens, and a second BOS token configured to initiate a prediction of next video caption tokens.

In this aspect, additionally or alternatively, the cross-modal encoder may comprise a merged fusion module configured to concatenate the local video tokens and local audio tokens, input the concatenated local video tokens and the concatenated local audio tokens into a first transformer and a second transformer, respectively, and output merged local video tokens and merged local audio tokens.

In this aspect, additionally or alternatively, keys and values of the first transformer may be derived from the local video tokens, and queries of the first transformer may be derived from the local audio tokens, and keys and values of the second transformer may be derived from the local audio tokens, and queries of the second transformer may be derived from the local video tokens.

In this aspect, additionally or alternatively, the cross-modal encoder comprises a global cross fusion module comprising a video transformer and an audio transformer may be configured to receive the local video tokens, the local audio tokens, global video tokens, and global audio tokens as input, and output fused local video tokens, fused global video tokens, fused local audio tokens, and fused global audio tokens.

In this aspect, additionally or alternatively, the video transformer may receive the local video tokens and global video tokens as queries, the local video tokens as keys, and the global audio tokens as values, and outputs the fused local video tokens and the fused global video tokens, and the audio transformer may receive the local audio tokens and the global audio tokens as queries, the local audio tokens as keys, and the global video tokens as values, and outputs the fused local audio tokens and the fused global audio tokens.

In this aspect, additionally or alternatively, the cross-modal encoder may comprise a global cross fusion module comprising a video transformer and an audio transformer configured to receive the local video tokens, the local audio tokens, global video tokens, and global audio tokens as input, and output fused local video tokens, fused global video tokens, fused local audio tokens, and fused global audio tokens, and a merged fusion module configured to concatenate the local video tokens and local audio tokens, input the concatenated local video tokens and the concatenated local audio tokens into a first transformer and a second transformer, respectively, and output merged local video tokens and merged local audio tokens, the merged local video tokens and the fused local video tokens being averaged to output averaged local video tokens, the merged local audio tokens and the fused local audio tokens being averaged to output averaged local audio tokens, and the averaged local video tokens and the averaged local audio tokens being iteratively inputted into a subsequent fusion layer of the cross-modal encoder.

In this aspect, additionally or alternatively, a cross-entropy loss function may be used to calculate an audio-only decoder loss, a video-only decoder loss, and a multi-modal decoder loss based on the generated video captions and ground truth captions, and trainable parameters of the cross-modal encoder and the caption decoder may be updated using the audio-only decoder loss, the video-only decoder loss, and the multi-modal decoder loss.

In this aspect, additionally or alternatively, an audio discrepancy index may be calculated between the audio-only decoder loss and the multi-modal decoder loss, a video discrepancy index may be calculated between the video-only decoder loss and the multi-modal decoder loss, and trainable parameters of the cross-modal encoder and the caption decoder may be updated using the audio discrepancy index and the video discrepancy index.

Another aspect provides a video captioning generation method comprising receiving an input video, extracting video frames from the input video, extracting video embeddings and audio embeddings from the video frames, including local video tokens and local audio tokens, respectively, inputting the local video tokens and the local audio tokens into at least a transformer layer of a cross-modal encoder to generate multi-modal embeddings, and generating video captions based on the multi-modal embeddings using a caption decoder.

In this aspect, additionally or alternatively, the method may further comprise initiating the generation of video captions by inputting one or more Beginning of Sentence (BOS) tokens into the caption decoder.

In this aspect, additionally or alternatively, the method may further comprise initiating a prediction of current video caption tokens by inputting a first BOS token of the one or more BOS tokens into the caption decoder, and initiating a prediction of next video caption tokens by inputting a second BOS token of the one or more BOS tokens into the caption decoder.

In this aspect, additionally or alternatively, the method may further comprise performing merged fusion by concatenating the local video tokens and local audio tokens, inputting the concatenated local video tokens and the concatenated local audio tokens into a first transformer and a second transformer, respectively, and outputting merged local video tokens and merged local audio tokens.

In this aspect, additionally or alternatively, the method may further comprise performing global cross fusion by receiving the local video tokens, the local audio tokens, global video tokens, and global audio tokens as input, and outputting fused local video tokens, fused global video tokens, fused local audio tokens, and fused global audio tokens.

In this aspect, additionally or alternatively, at a video transformer, the local video tokens and global video tokens are received as queries, the local video tokens are received as keys, and the global audio tokens are received as values, and the fused local video tokens and the fused global video tokens are outputted by the video transformer, and at an audio transformer, the local audio tokens and the global audio tokens are received as queries, the local audio tokens as keys, and the global video tokens as values, and the fused local audio tokens and the fused global audio tokens are outputted by the audio transformer.

In this aspect, additionally or alternatively, the method may further comprise performing merged fusion by concatenating the local video tokens and local audio tokens, inputting the concatenated local video tokens and the concatenated local audio tokens into a first transformer and a second transformer, respectively, and outputting merged local video tokens and merged local audio tokens, performing global cross fusion by receiving the local video tokens, the local audio tokens, global video tokens, and global audio tokens as input, and outputting fused local video tokens, fused global video tokens, fused local audio tokens, and fused global audio tokens, averaging the merged local video tokens and the fused local video tokens to output averaged local video tokens, averaging the merged local audio tokens and the fused local audio tokens to output averaged local audio tokens, and iteratively inputting the averaged local video tokens and the averaged local audio tokens into a subsequent fusion layer of the cross-modal encoder.

In this aspect, additionally or alternatively, the method may further comprise using a cross-entropy loss function to calculate an audio-only decoder loss, a video-only decoder loss, and a multi-modal decoder loss based on the generated video captions and ground truth captions, and updating trainable parameters of the cross-modal encoder and the caption decoder using the audio-only decoder loss, the video-only decoder loss, and the multi-modal decoder loss.

In this aspect, additionally or alternatively, the method may further comprise calculating an audio discrepancy index between the audio-only decoder loss and the multi-modal decoder loss, calculating a video discrepancy index between the video-only decoder loss and the multi-modal decoder loss, and updating trainable parameters of the cross-modal encoder and the caption decoder using the audio discrepancy index and the video discrepancy index.

Another aspect provides a video captioning generation system comprising a processor and memory of a computing device, the processor being configured to execute a program using portions of memory to receive an input video, extract video frames from the input video, extract video embeddings including local video tokens, extract audio embeddings comprising local audio tokens corresponding to the local video tokens, input the local video tokens and the local audio tokens into at least a transformer layer of a cross-modal encoder to generate multi-modal embeddings, and generate video captions based on the multi-modal embeddings using a caption decoder.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A video captioning generation system comprising:
   a processor and memory of a computing device, the processor being configured to execute a program using portions of memory to:
   receive an input video;
   extract video frames from the input video;
   extract video embeddings and audio embeddings from the video frames, the video embeddings including local video tokens and global video tokens, and the audio embeddings including local audio tokens and global audio tokens;

input the local video tokens and the local audio tokens into at least a transformer layer of a cross-modal encoder to generate multi-modal embeddings;

input the global video tokens, the global audio tokens, the local video tokens, and the local audio tokens into a global cross fusion module of the cross-modal encoder to generate fused local video tokens, fused global video tokens, fused local audio tokens, and fused global audio tokens; and generate video captions based on the multi-modal embeddings using a caption decoder, the multi-modal embeddings including the fused local video tokens, the fused global video tokens, the fused local audio tokens, and the fused global audio tokens.

2. The video captioning generation system of claim 1, wherein the generation of video captions is initiated by inputting one or more Beginning of Sentence (BOS) tokens into the caption decoder.

3. The video captioning generation system of claim 2, wherein the BOS tokens include:

a first BOS token configured to initiate a prediction of current video caption tokens; and a second BOS token configured to initiate a prediction of next video caption tokens.

4. The video captioning generation system of claim 1, wherein the cross-modal encoder comprises a merged fusion module configured to:

concatenate the local video tokens and local audio tokens;

input the concatenated local video tokens and the concatenated local audio tokens into a first transformer and a second transformer, respectively; and output merged local video tokens and merged local audio tokens.

5. The video captioning generation system of claim 4, wherein keys and values of the first transformer are derived from the local video tokens, and queries of the first transformer are derived from the local audio tokens; and keys and values of the second transformer are derived from the local audio tokens, and queries of the second transformer are derived from the local video tokens.

6. The video captioning generation system of claim 1, wherein the global cross fusion module comprises a video transformer and an audio transformer;

the video transformer receives the local video tokens and the global video tokens as queries, the local video tokens as keys, and the global audio tokens as values, and outputs the fused local video tokens and the fused global video tokens; and the audio transformer receives the local audio tokens and the global audio tokens as queries, the local audio tokens as keys, and the global video tokens as values, and outputs the fused local audio tokens and the fused global audio tokens.

7. The video captioning generation system of claim 1, wherein the cross-modal encoder comprises:

a merged fusion module configured to:

concatenate the local video tokens and local audio tokens, input the concatenated local video tokens and the concatenated local audio tokens into a first transformer and a second transformer, respectively, and output merged local video tokens and merged local audio tokens, wherein the merged local video tokens and the fused local video tokens are averaged to output averaged local video tokens;

the merged local audio tokens and the fused local audio tokens are averaged to output averaged local audio tokens; and the averaged local video tokens and the averaged local audio tokens are iteratively inputted into a subsequent fusion layer of the cross-modal encoder.

8. The video captioning generation system of claim 1, wherein a cross-entropy loss function is used to calculate an audio-only decoder loss, a video-only decoder loss, and a multi-modal decoder loss based on the generated video captions and ground truth captions; and trainable parameters of the cross-modal encoder and the caption decoder are updated using the audio-only decoder loss, the video-only decoder loss, and the multi-modal decoder loss.

9. The video captioning generation system of claim 8, wherein an audio discrepancy index is calculated between the audio-only decoder loss and the multi-modal decoder loss;

a video discrepancy index is calculated between the video-only decoder loss and the multi-modal decoder loss; and trainable parameters of the cross-modal encoder and the caption decoder are updated using the audio discrepancy index and the video discrepancy index.

10. A video captioning generation method comprising:

receiving an input video;

extracting video frames from the input video;

extracting video embeddings and audio embeddings from the video frames, the video embeddings including local video tokens and global video tokens, and the audio embeddings including local audio tokens and global audio tokens, respectively;

inputting the local video tokens and the local audio tokens into at least a transformer layer of a cross-modal encoder to generate multi-modal embeddings;

performing global cross fusion on the global video tokens, the global audio tokens, the local video tokens, and the local audio token to generate fused local video tokens, fused global video tokens, fused local audio tokens, and fused global audio tokens; and generating video captions based on the multi-modal embeddings using a caption decoder, the multi-modal embeddings including the fused local video tokens, the fused global video tokens, the fused local audio tokens, and the fused global audio tokens.

11. The video captioning generation method of claim 10, further comprising:

initiating the generation of video captions by inputting one or more Beginning of Sentence (BOS) tokens into the caption decoder.

12. The video captioning generation method of claim 11, further comprising:

initiating a prediction of current video caption tokens by inputting a first BOS token of the one or more BOS tokens into the caption decoder; and initiating a prediction of next video caption tokens by inputting a second BOS token of the one or more BOS tokens into the caption decoder.

13. The video captioning generation method of claim 10, further comprising performing merged fusion by:

concatenating the local video tokens and local audio tokens;

inputting the concatenated local video tokens and the concatenated local audio tokens into a first transformer and a second transformer, respectively; and outputting merged local video tokens and merged local audio tokens.

14. The video captioning generation method of claim 10, wherein at a video transformer, the local video tokens and the global video tokens are received as queries, the local video tokens are received as keys, and the global audio tokens are received as values, and the fused local video tokens and the fused global video tokens are outputted by the video transformer; and at an audio transformer, the local audio tokens and the global audio tokens are received as queries, the local audio tokens as keys, and the global video tokens as values, and the fused local audio tokens and the fused global audio tokens are outputted by the audio transformer.

15. The video captioning generation method of claim 10, further comprising:

performing merged fusion by:

concatenating the local video tokens and local audio tokens, inputting the concatenated local video tokens and the concatenated local audio tokens into a first transformer and a second transformer, respectively, and outputting merged local video tokens and merged local audio tokens;

averaging the merged local video tokens and the fused local video tokens to output averaged local video tokens;

averaging the merged local audio tokens and the fused local audio tokens to output averaged local audio tokens; and iteratively inputting the averaged local video tokens and the averaged local audio tokens into a subsequent fusion layer of the cross-modal encoder.

16. The video captioning generation method of claim 10, further comprising:

using a cross-entropy loss function to calculate an audio-only decoder loss, a video-only decoder loss, and a multi-modal decoder loss based on the generated video captions and ground truth captions; and updating trainable parameters of the cross-modal encoder and the caption decoder using the audio-only decoder loss, the video-only decoder loss, and the multi-modal decoder loss.

17. The video captioning generation method of claim 16, further comprising:

calculating an audio discrepancy index between the audio-only decoder loss and the multi-modal decoder loss;

calculating a video discrepancy index between the video-only decoder loss and the multi-modal decoder loss; and updating trainable parameters of the cross-modal encoder and the caption decoder using the audio discrepancy index and the video discrepancy index.

18. A video captioning generation system comprising:

a processor and memory of a computing device, the processor being configured to execute a program using portions of memory to:

receive an input video;

extract video frames from the input video;

extract video embeddings including local video tokens and global video tokens;

extract audio embeddings comprising local audio tokens and global audio tokens corresponding to the local video tokens and the global video tokens;

input the local video tokens and the local audio tokens into at least a transformer layer of a cross-modal encoder to generate multi-modal embeddings;

input the global video tokens, the global audio tokens, the local video tokens, and the local audio tokens into a global cross fusion module of the cross-modal encoder to generate fused local video tokens, fused global video tokens, fused local audio tokens, and fused global audio tokens; and generate video captions based on the multi-modal embeddings using a caption decoder, the multi-modal embeddings including the fused local video tokens, the fused global video tokens, the fused local audio tokens, and the fused global audio tokens.

* * * * *